(12) United States Patent  
Tsuchiya et al.

(10) Patent No.: US 9,122,407 B2  
(45) Date of Patent: Sep. 1, 2015

(54) DEDUPLICATION DEVICE AND DEDUPLICATION METHOD

(71) Applicant: FUJITSU LIMITED, Kawasaki-shi, Kanagawa (JP)

(72) Inventors: Yoshihiro Tsuchiya, Yokohama (JP); Takashi Watanabe, Kawasaki (JP); Yasuo Noguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 13/958,668

(22) Filed: Aug. 5, 2013

(65) Prior Publication Data

US 2014/0059016 A1 Feb. 27, 2014

(30) Foreign Application Priority Data

Aug. 22, 2012 (JP) ................................. 2012-183085

(51) Int. Cl.
*G06F 3/06* (2006.01)
*G06F 17/30* (2006.01)

(52) U.S. Cl.
CPC ............ *G06F 3/0641* (2013.01); *G06F 3/0608* (2013.01); *G06F 3/0673* (2013.01); *G06F 17/30156* (2013.01)

(58) Field of Classification Search
CPC .......................... G06F 3/0641; G06F 17/30156
USPC ...................................................... 707/692
See application file for complete search history.

(56) References Cited

U.S. PATENT DOCUMENTS

| | | | |
|---|---|---|---|
| 6,928,526 B1 * | 8/2005 | Zhu et al. ...................... | 711/154 |
| 2010/0285790 A1 | 11/2010 | Baliosian et al. | |
| 2014/0188912 A1 * | 7/2014 | Watanabe et al. ............. | 707/754 |
| 2014/0258245 A1 * | 9/2014 | Estes ............................. | 707/692 |

FOREIGN PATENT DOCUMENTS

| | | |
|---|---|---|
| JP | 09-016607 | 1/1997 |
| JP | 2010-531086 | 9/2010 |
| JP | 2011-171995 | 9/2011 |

OTHER PUBLICATIONS

Lu, Guanlin et al., "Frequency Based Chunking for Data De-Duplication," Department of Computer Science and Engineering, University of Minnesota (Aug. 17-19, 2010).

* cited by examiner

*Primary Examiner* — Jensen Hu  
(74) *Attorney, Agent, or Firm* — Fujitsu Patent Center

(57) ABSTRACT

A deduplicate device includes: a first through N-th (N≥3) bloom filters; a counting unit that performs a process of judging whether information indicating that a duplicate data of a storing-target data exists in a storage device is registered in each bloom filter sequentially until an unregistered bloom filter in which the information is not registered is found or that the information is registered in the N-th bloom filter is found, and registers, when the unregistered bloom filter is found, the information indicating that the duplicate data exists into the unregistered bloom filter; and a deduplicating unit that stores the storing-target data in the storage device when the counting unit finds the unregistered bloom filter, and stores index information relating the duplicate data in the storage device with the storing-target data when the counting unit finds that the information is registered in the N-th bloom filter.

5 Claims, 5 Drawing Sheets

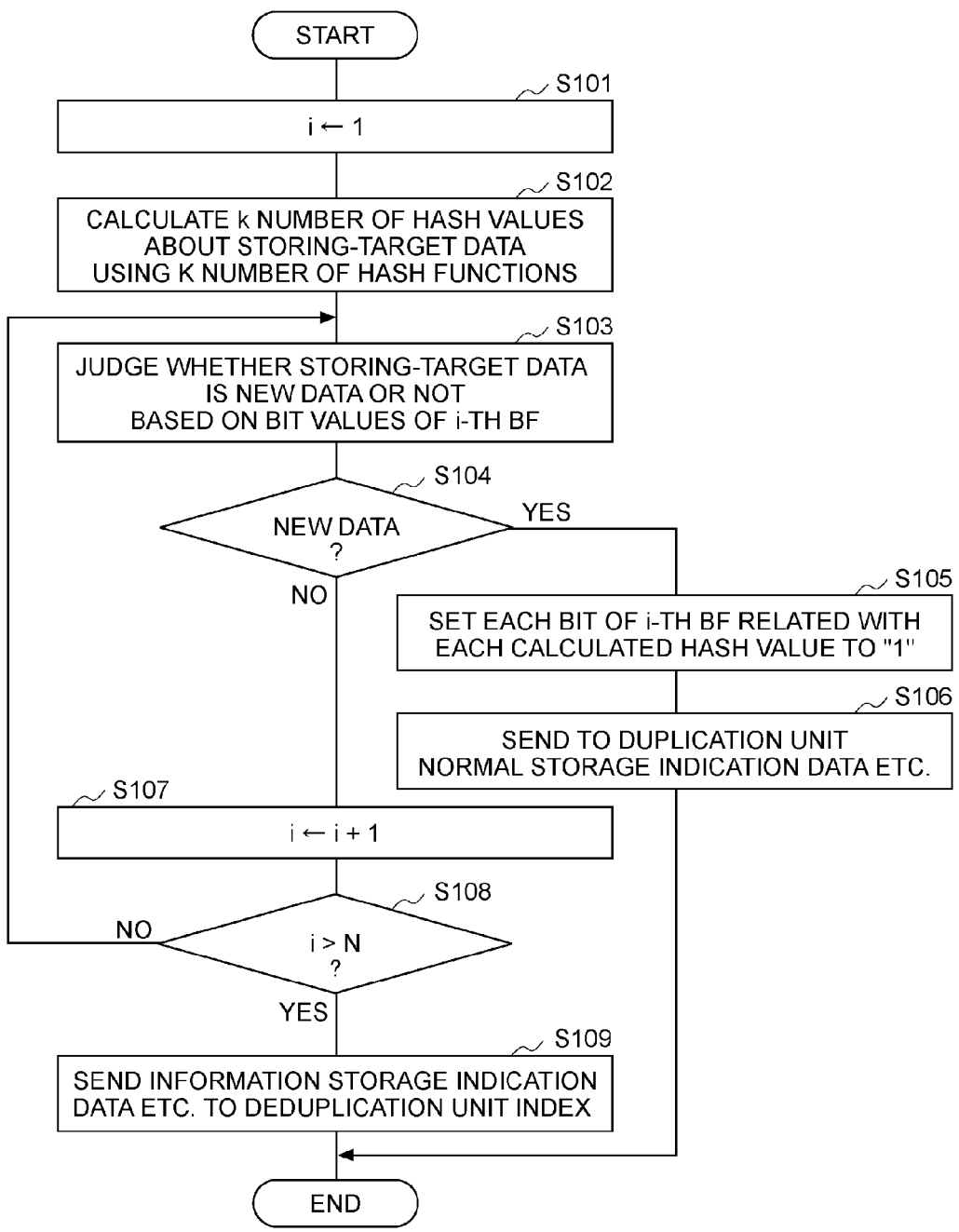

DEDUPLICATION DEVICE AND DEDUPLICATION METHOD

CROSS-REFERENCE TO RELATED APPLICATION

This application is based upon and claims the benefit of priority of the prior Japanese Patent Application No. 2012-183085, filed on Aug. 22, 2012, the entire contents of which are incorporated herein by reference.

FIELD

The present invention relates to a deduplication device, a deduplication method, and a untransitory computer readable medium.

BACKGROUND

As a storage system, there exists a system which divides data instructed to store into a plurality of data having relatively small size and does not store each divided data of which a precise duplicate is already stored.

PRIOR ART REFERENCES

Patent document 1: Japanese National Publication of International Patent Application No. 2010-531086
Patent document 2: Japanese Laid-open Patent Publication No. 9-16607.
Patent document 3: Japanese Laid-open Patent Publication No. 2011-171995

Although the existing storage system having the above capability is one that deduplicates (dose not store) the second and latter duplicate data, there are cases where deduplication of the N-th (N≥3) and latter duplicate data is preferable depending on the type of data which will be stored in the storage device. However, it is not that efficient to manage the duplication number of each data using counters in order for deduplication of the N-th (N≥3) and latter duplicate data.

SUMMARY

According to an aspect of the embodiments, a deduplicate device includes: a first through N-th (N≥3) bloom filters; a counting unit that performs a process of judging whether information indicating that a duplicate data of a storing-target data exists in a storage device is registered in each bloom filter sequentially in an order of the first through N-th bloom filters until an unregistered bloom filter in which the information is not registered is found or that the information is registered in the N-th bloom filter is found, and registers, when the unregistered bloom filter is found, the information indicating that the duplicate data of the storing-target data exists in the storage device into the unregistered bloom filter; and a deduplicating unit that stores the storing-target data in the storage device when the counting unit finds the unregistered bloom filter, and stores index information that relates the duplicate data of the storing-target data in the storage device with the storing-target data when the counting unit finds that the information is registered in the N-th bloom filter.

According to another aspect of the embodiments, a deduplicate method includes: performing, at a computer, a process of judging whether information indicating that a duplicate data of a storing-target data exists in a storage device is registered in each bloom filter sequentially in an order of the first through N-th (N≥3) bloom filters until an unregistered bloom filter in which the information is not registered is found or that the information is registered in the N-th bloom filter is found; registering, at the computer, when the unregistered bloom filter is found, the information indicating that the duplicate data of the storing-target data exists in the storage device into the unregistered bloom filter; and storing, at the computer, the storing-target data in the storage device when the counting unit finds the unregistered bloom filter, and stores index information that relates the duplicate data of the storing-target data in the storage device with the storing-target data when the counting unit finds that the information is registered in the N-th bloom filter.

According to still another aspect of the embodiments, a untransitory computer-readable recording medium having stored therein a program for causing a computer to execute a process including: performing a process of judging whether information indicating that a duplicate data of a storing-target data exists in a storage device is registered in each bloom filter sequentially in an order of the first through N-th (N≥3) bloom filters until an unregistered bloom filter in which the information is not registered is found or that the information is registered in the N-th bloom filter is found; registering, when the unregistered bloom filter is found, the information indicating that the duplicate data of the storing-target data exists in the storage device into the unregistered bloom filter; and storing the storing-target data in the storage device when the counting unit finds the unregistered bloom filter, and stores index information that relates the duplicate data of the storing-target data in the storage device with the storing-target data when the counting unit finds that the information is registered in the N-th bloom filter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart of a counting process performed by a counting unit included in the deduplication device according to the embodiment.

DESCRIPTION OF EMBODIMENTS

Embodiment of the present invention is hereinafter described in detail with reference to the drawings. Note that the embodiment described below is illustrative only of the present invention, and the present invention can also be realized also in the forms where concrete arrangements and/or procedures differ from those of the embodiment.

Figure 1:
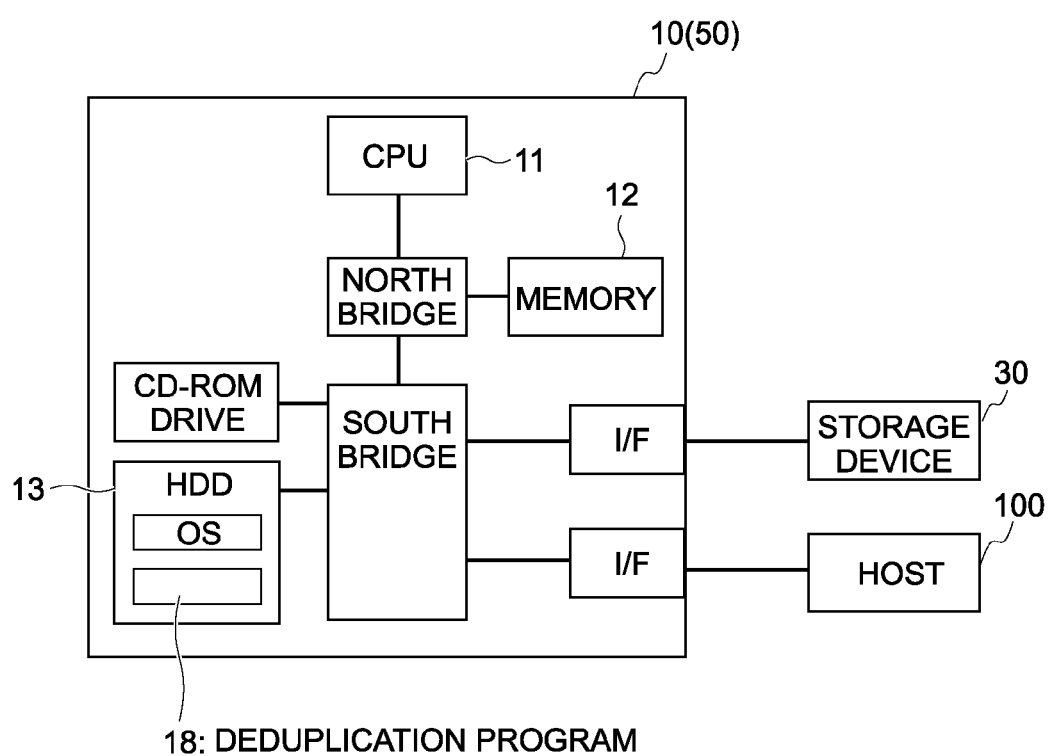
FIG. 1 is a hardware configuration diagram of a deduplication device according to an embodiment.

FIG. 1 illustrates a hardware configuration diagram of a deduplication device 10 according to an embodiment. Further, FIG. 2 illustrates a functional block diagram of the deduplication device 10 according to the embodiment.

As illustrated in FIG. 1, the deduplication device 10 according to the present embodiment is a device where an OS (Operating System), a deduplication program 18, etc. are installed on an HDD (Hard Disk Drive) 13 in a computer 50 which will be connected with a storage device 30 and a host 100.

Figure 2:
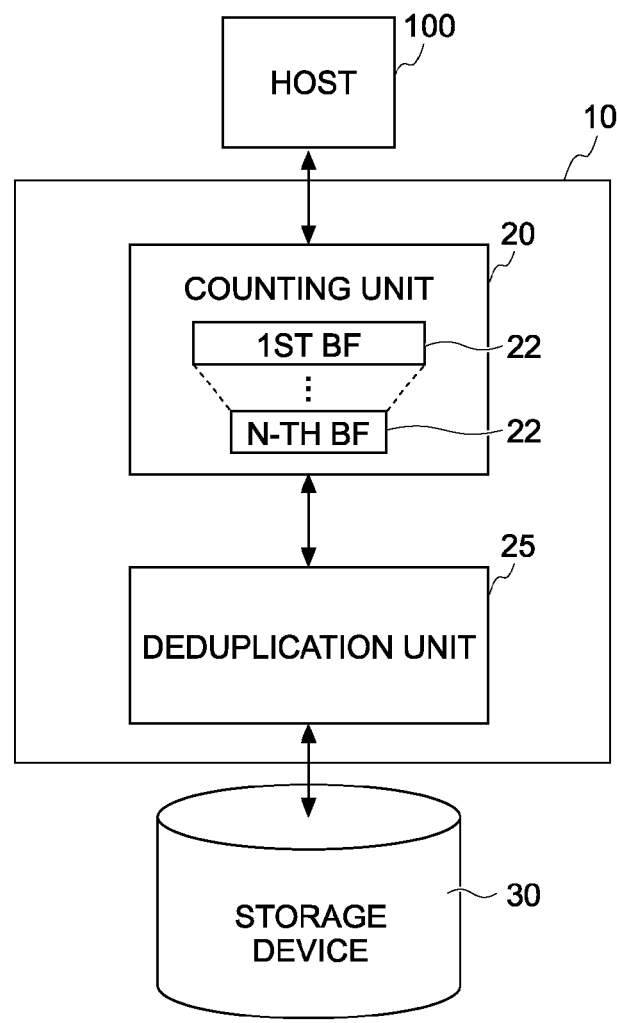
FIG. 2 is a functional block diagram of the deduplication device according to the embodiment.

The deduplication program 18 is a program for causing the computer 50 to function as the deduplication device 10 illustrated in FIG. 2, i.e., the deduplication device 10 including a counting unit 20 and a deduplication unit 25.

The deduplication unit 25 is a unit (functional block) which, when receiving a storing-target data and its logical block address together with normal storage indication data, stores the storing-target data in the storage device 30. The deduplication unit 25 is also a unit which, when receiving a storing-target data and its logical block address together with an index information storage indication data, stores a piece of index information for relating the storing-target data with its duplicate data within the storage device 30.

Process performed by the deduplication unit 25 is essentially the same as that performed by the typical deduplication device or the deduplication engine in the typical deduplication storage system. Therefore, a detailed explanation of the process is herein omitted.

The counting unit 20 is a unit which, with respect to each storing-target data (and its logical block address) received from the host 100, determines either of the storing-target data itself and the index information related to the storing-target data is to be stored in the storage device 30 and instructs the deduplication unit 25 to store the determined information.

The counting unit includes k ($\geq 2$) number of hash functions and N ($\geq 2$) number of bloom filters 22 from the 1st bloom filter 22 to the N-th bloom filter 22. Incidentally, as a value for N, a value that is determined in consideration of a pattern of use and a memory size of the storage device 30 is generally used. Hereinafter, the i-th ($1<=i<=N$) bloom filter 22 will also be referred to as the i-BF 22 or the i-th BF 22.

Each hash value that may be returned by each hash function is related with one bit in the individual bloom filters 22.

Further, as schematically illustrated by the dotted lines in FIG. 2, the bit number of each bloom filter 22 decreases in order of the 1st bloom filter 22, the 2nd bloom filter 22, . . . , the N-th bloom filter 22. Note that, although the reason why the bit numbers of the bloom filters 22 are determined as mentioned above will be discussed later, the bit number and the value for k of each bloom filter 22 is determined so that the probability of the incorrect judging due to the false positive can be sufficiently reduced.

Moreover, the counting unit 20 is configured (programmed) so as to perform a counting process whose procedures are shown in FIG. 3 when receiving a storing-target data from the host 100.

Namely, the counting unit 20 having received a storing-target data from the host 100, first, sets a variable i to "1" (step S101). Next, the counting unit 20 calculates k number of hash values about the storing-target data using the k number of hash functions (step S102).

Thereafter, the counting unit 20 performs a process of judging whether the storing-target data is a new data or not based on bit values of the i-th BF22 (step S103). That is, at step S103, the counting unit 20 reads from the i-th BF22 the bit value related with each calculated hash value. If the bit value related with a calculated hash value is "0," the counting unit 20 judges that the storing-target data is a new data and terminates the process of step S103. Further, if the bit value related with every calculated hash value is "1," the counting unit 20 judges that the storing-target data is not a new data (that data same as the storing-target data is stored in the storage device 30) and terminates the process of step S103.

When judging that the storing-target data is a new data (step S104; YES), the counting unit 20 sets each bit of the i-BF related with each calculated hash value to "1" (step S105). Then, the counting unit 20 sends normal storage indication data, the storing-target data and the logical block address thereof to the duplication unit 25 (step S1-6) and thereafter terminates this counting process.

On the contrary, when judging the storing-target data is not a new data (step S104; NO), the counting unit adds "1" to the variable i (step S107). Then, the counting unit 20 judges whether i>N is satisfied or not (step S108). If i>N is not satisfied (step S108; NO), the counting unit 20 starts the processing subsequent to step S103.

When i>N is satisfied (step S108; YES) after some repetition of the above processing, the counting unit sends index information storage indication data, the storing-target data and its logical block address to the deduplication unit 25 (step S109) and then finishes the counting process.

Figure 4A:
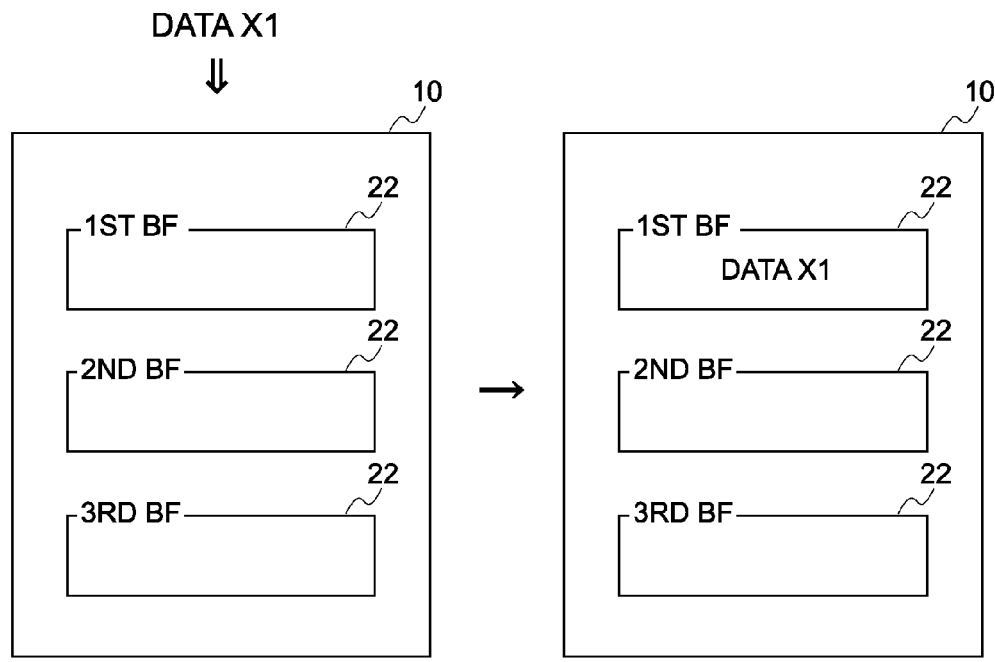
FIG. 4A is an explanatory diagram of operations of the deduplication device according to the embodiment.
Figure 4B:
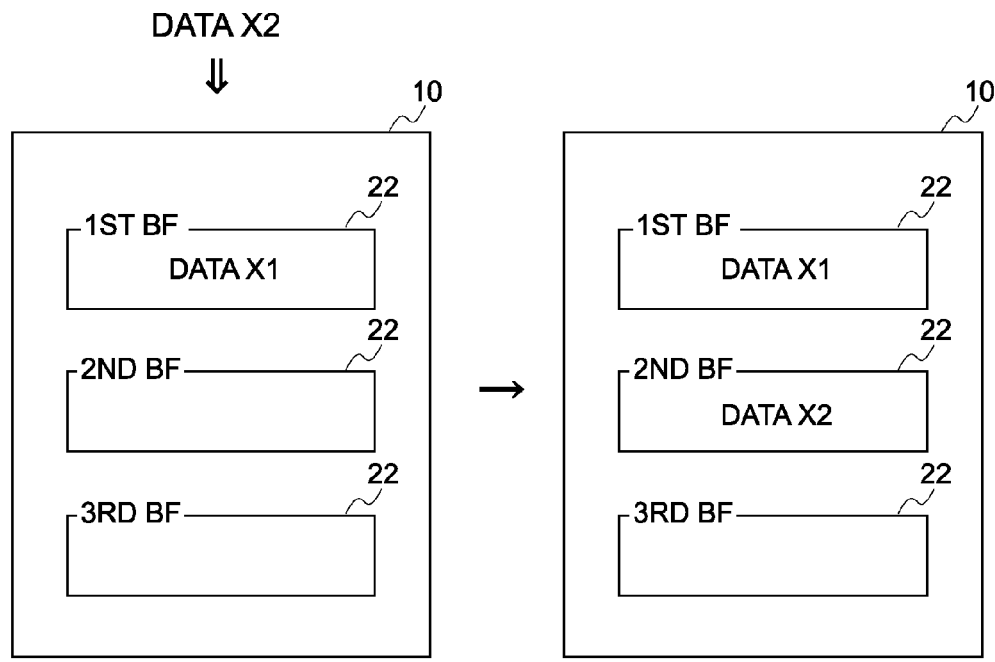
FIG. 4B is an explanatory diagram of operations of the deduplication device according to the embodiment.
Figure 4C:
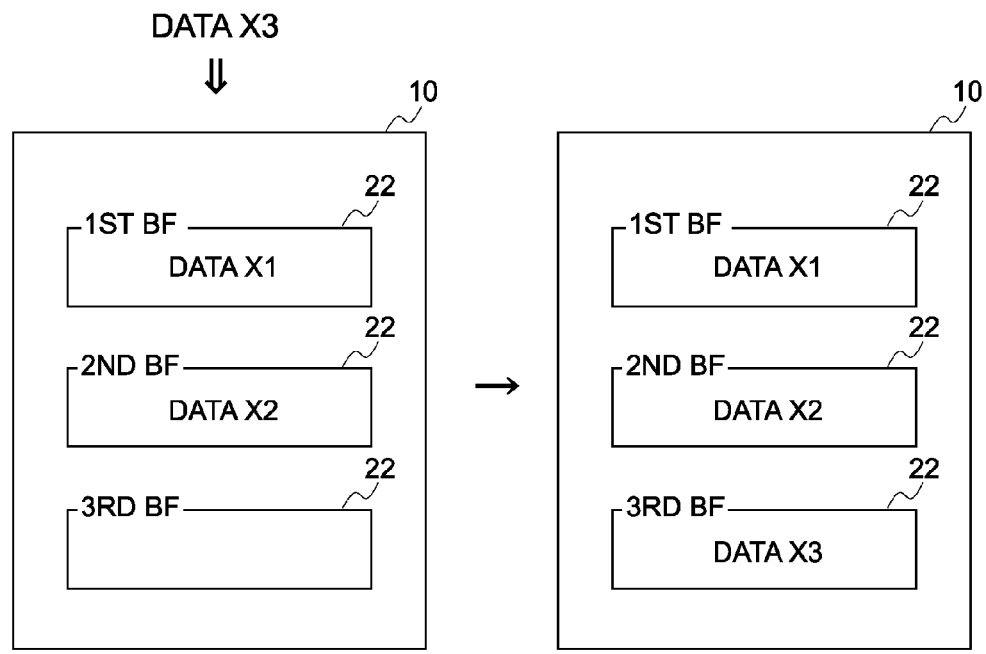
FIG. 4C is an explanatory diagram of operations of the deduplication device according to the embodiment.

Operation of the deduplication device 10 will be described giving an example of the case where N=3 with reference to FIGS. 4A through 4C.

Let's assume the case where the same update target data (hereinafter referred simply to as data) X1 through X4 are transmitted from the host 100 in this order under the condition where all bits of every BF 22 are 0's.

In this case, the data X1 is judged to be a new data in the process of step S103 that is performed when i=1. Hence, as schematically shown in FIG. 4A, information ("DATA X1") indicating that the data X1 exists in the storage device 30 is registered by the process of step S105. Then, the process of step S106 is performed, and therefore the data X1 is stored in the storage device 30.

Further, the update target data X2 is judged to not be a new data in the process of step S103 performed when i=1 and is judged to be a new data in the process of step S103 performed when i=2. Therefore, as schematically shown in FIG. 4B, information ("DATA X2") indicating that the data X2 exists in the storage device 30 is registered by the process of step S105. Moreover, since the process of step S106 is performed, the data X2 is stored in the storage device 30.

The data X3 is judged to not be a new data in each process of step S103 performed when i=1 or 2 and is judged to be a new data in the process of step S103 performed when i=3. Therefore, as schematically shown in FIG. 4C, information ("DATA X3") indicating that the data X3 exists in the storage device 30 is registered by the process of step S105. Moreover, since the process of step S106 is performed, the data X3 is stored in the storage device 30.

The data X4 is judged to not be a new data in each process of step S103 performed when i=1, 2 or 3. When the process of step S107 is performed in a state where i=3, it follows that i>N is satisfied. Hence, as for the data X4, i.e., the N-th redundant data, the process of step S109 is performed, and therefore not the data X4 itself but the index information is stored in the storage device 30.

As discussed above, the deduplication device 10 according the present embodiment is configured so as to deduplicate the N-th and latter duplication data by repeating N times of determination of the presence or absence of data using the BF 22, which can be performed at high speed regardless of the number of data. Further, since searching for data to be incremented takes time when the number of duplication of each of many data is managed using counters, it can be said that the deduplication device 10 is an apparatus capable of performing deduplication of the N-th and latter duplicate data efficiently (in a way that allows the size of the control data for deduplication to be fitted for the memory size).

Modified Embodiments

The deduplication device 10 discussed above can be modified in a variety of forms. For instance, For instance, the deduplication device 10 can be modified into a device including N number of BFs 22 each having the same number of bits. However, when the above-mentioned process is used, the number of data managed by the j-th (j≥2) BF 22 is always smaller than the number of data managed by the (j−1)-th BF 22. Therefore, as for the bit number of BF 22, in order that the storage capacity of a memory is not consumed vainly, it is preferable that the bit numbers of BFs 22 are made sequentially smaller toward the poststage-side BF 22. However, the bit number of only the N-th BF 22 may be lessened, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A deduplication device, comprising:
   a first through N-th (N≥3) bloom filters;
   a counting unit that performs a process of judging whether information indicating that duplicate data of a storing-target data exists in a storage device is registered in each bloom filter sequentially and repeatedly in an order of the first through N-th bloom filters until an unregistered bloom filter in which the information is not registered is found or that the information is registered in the N-th bloom filter is found, registers, when the unregistered bloom filter is found, the information indicating that the duplicate data of the storing-target data exists in the storage device into the unregistered bloom filter, and registers, when the N-th bloom filter is found, the information indicating that the duplicate data of the storing-target data exists in the storage device into the N-th bloom filter; and
   a deduplicating unit that stores the storing-target data in the storage device when the counting unit finds the unregistered bloom filter, and stores index information that relates the duplicate data of the storing-target data in the storage device with the storing-target data to deduplicate the N-th and latter duplication data when the counting unit finds based on an adding variable that the information is registered in the N-th bloom filter.

2. The deduplication device according to claim 1, wherein bit number of the first bloom filter is larger than bit number of the N-th bloom filter.

3. The deduplication device according to claim 1, wherein bit number of each bloom filter decreases in order of the first through N-th bloom filters.

4. A deduplication method, comprising:
   performing, at a computer, a process of judging whether information indicating that duplicate data of a storing-target data exists in a storage device is registered in each bloom filter sequentially and repeatedly in an order of the first through N-th (N≥3) bloom filters until an unregistered bloom filter in which the information is not registered is found or that the information is registered in the N-th bloom filter is found;
   registering, at the computer, when the unregistered bloom filter is found, the information indicating that the duplicate data of the storing-target data exists in the storage device into the unregistered bloom filter, and registering, when the N-th bloom filter is found, the information indicating that the duplicate data of the storing-target data exists in the storage device into the N-th bloom filter; and
   storing, at the computer, the storing-target data in the storage device when finding the unregistered bloom filter, and storing index information that relates the duplicate data of the storing-target data in the storage device with the storing-target data to deduplicate the N-th and later duplication data when finding based on an adding variable that the information is registered in the N-th bloom filter.

5. A non-transitory computer-readable recording medium having stored therein a program for causing a computer to execute a process comprising:
   performing a process of judging whether information indicating that duplicate data of a storing-target data exists in a storage device is registered in each bloom filter sequentially and repeatedly in an order of the first: through N-th (N≥3) bloom filters until an unregistered bloom filter in which the information is not registered is found or that the information is registered in the N-th bloom filter is found;
   registering, when the unregistered bloom filter is found, the information indicating that the duplicate data of the storing-target data exists in the storage device into the unregistered bloom filter, and registering, when the N-th bloom filter is found, the information indicating that the duplicate data of the storing-target data exists in the storage device into the N-th bloom filter; and
   storing the storing-target data in the storage device when finding the unregistered bloom filter, and storing index information that relates the duplicate data of the storing-target data in the storage device with the storing-target data to deduplicate the N-th and later duplication data when finding based on adding variable that the information is registered in the N-th bloom filter.

* * * * *